(12) United States Patent
Liu et al.

(10) Patent No.: US 11,796,315 B2
(45) Date of Patent: Oct. 24, 2023

(54) OPTICAL DEVICE AND PRISM MODULE THEREOF

(71) Applicants: Sintai Optical (Shenzhen) Co., Ltd., ShenZhen (CN); Asia Optical Co., Inc., Taichung (TW)

(72) Inventors: Bin Liu, ShenZhen (CN); Hua-Tang Liu, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 439 days.

(21) Appl. No.: 17/301,576

(22) Filed: Apr. 8, 2021

(65) Prior Publication Data

US 2021/0325178 A1  Oct. 21, 2021

(30) Foreign Application Priority Data

Apr. 15, 2020 (CN) .......................... 202010297344.9

(51) Int. Cl.
*G01C 3/02* (2006.01)
*G02B 5/04* (2006.01)
*G01C 3/10* (2006.01)

(52) U.S. Cl.
CPC .................. *G01C 3/02* (2013.01); *G01C 3/10* (2013.01); *G02B 5/04* (2013.01)

(58) Field of Classification Search
CPC ... G02B 5/04; G01C 3/02; G01C 3/10; G01C 15/00; G03B 13/20; G03B 13/06
See application file for complete search history.

(56) References Cited

U.S. PATENT DOCUMENTS

| | | | |
|---|---|---|---|
| 6,292,314 B1* | 9/2001 | Perger | G02B 23/10 359/638 |
| 2005/0128608 A1 | 6/2005 | Sakai | |
| 2006/0077855 A1* | 4/2006 | Sun | G11B 7/13922 369/44.37 |
| 2009/0174939 A1* | 7/2009 | Heintz | G02B 5/04 359/480 |
| 2015/0055116 A1* | 2/2015 | Liu | G01S 7/481 359/836 |
| 2017/0276927 A1* | 9/2017 | Chen | G02B 5/208 |
| 2017/0350697 A1* | 12/2017 | Chen | G02B 5/04 |
| 2020/0340810 A1* | 10/2020 | Ma | G01C 3/08 |

FOREIGN PATENT DOCUMENTS

| | | |
|---|---|---|
| JP | H09244103 A | 9/1997 |
| TW | 201109626 A | 3/2011 |
| TW | 201508333 A | 3/2015 |
| TW | 201508334 A | 3/2015 |
| TW | 201626044 A | 7/2016 |
| TW | 201734508 A | 10/2017 |
| TW | 202041905 A | 11/2020 |

* cited by examiner

*Primary Examiner* — Sang H Nguyen
(74) *Attorney, Agent, or Firm* — McClure, Qualey & Rodack, LLP

(57) ABSTRACT

An optical device includes an objective module, a prism module and an ocular module. The prism module includes a first prism, a second prism and a first coating. The prism module is disposed between the objective module and the ocular module. A first light beam emitted by an object sequentially passes through the objective module, the prism module and the ocular module. Central axes of the objective module and the ocular module are in parallel without overlapping.

17 Claims, 5 Drawing Sheets

OPTICAL DEVICE AND PRISM MODULE THEREOF

BACKGROUND OF THE INVENTION

Field of the Invention

The invention relates to an optical device and a prism module thereof, and more particularly to a laser rangefinder and a prism module thereof.

Description of the Related Art

Referring to FIG. 1, a conventional rangefinder 10 includes an objective module (not shown), a prism module 11, an organic light-emitting diode (OLED) 12, a light emitter 13, a light receiver (not shown) and an ocular module (not shown). The prism module 11 is disposed between the objective module and the ocular module and includes a first prism 14, a second prism 15 and a third prism 16. The first prism 14 is disposed to contact the second prism 15. The third prism 16 is disposed near the second prism 15. The OLED 12 and the light emitter 13 are disposed near and at a side of the first prism 14. The second prism 15 and the third prism 16 are combined to form a Schmidt-Pechan prism system.

In operation, a first light beam A emitted from an object (not shown) sequentially passes through the objective module, the second prism 15, the third prism 16 and the ocular module to provide an image of the object for user's view. A second light beam B emitted by the OLED 12 is reflected by a reflecting mirror 17 and sequentially passes through the first prism 14, the second prism 15, the third prism 16 and the ocular module to provide an image information and a reticle (generated by the OLED 12) for user's view. A third light beam C emitted by the light emitter 13 is reflected by another reflecting mirror 18, sequentially passes through the first prism 14, the second prism 15 and the objective module, reaches the object, and is reflected back to the light receiver by the object for calculating the distance between the object and the rangefinder 10.

In the prism module 11, however, the Schmidt-Pechan prism system including the second prism 15 and the third prism 16 generally has a problem of light leakage that affects the image quality of the rangefinder 10 when the rangefinder 10 is provided with the prism module 11. Further, the prism module 11 has a large dimension in Y direction (shown in FIG. 1) so that the rangefinder 10 provided with the prism module 11 is too large. If the objective module and the ocular module of the rangefinder 10 are not coaxially arranged, then the prism module 11 will be even larger. Then, the rangefinder 10 provided with the prism module 11 will be larger. Further, the brightness of the image generated by the OLED 12 is reduced due to multi-reflections of the second light beam B in the prism module 11. Further, energy of the third light beam C is attenuated because of the interference between the third light beam C (emitted by the light emitter 13) and the second light beam B (emitted by the OLED 12) which are arranged with their effective optical diameters overlapped.

BRIEF SUMMARY OF THE INVENTION

The invention provides an optical device (rangefinder) which includes a new prism module to reduce the volume, improve the image quality, and ensure that the brightness of the image generated by the display unit and energy of the light beam generated by the light emitter are sufficiently high.

A prism module in accordance with an exemplary embodiment of the invention includes a first prism, a second prism and a first coating. The first prism includes a first surface, a second surface, a third surface and a fourth surface wherein the fourth surface adjoins the second surface and the first surface, and the first surface adjoins the fourth surface and the third surface. The second prism includes a fifth surface, a sixth surface and a seventh surface wherein the seventh surface of the second prism is disposed beside the third surface of the first prism. The first coating is disposed between the third surface and the seventh surface. A light emitter is configured to emit a third light beam to an object. A light receiver is configured to receive the third light beam reflected by the object for calculating a distance between the object and the light receiver. A first light beam is emitted by the object, enters the first prism through the first surface, is sequentially reflected on the second surface and the third surface, and leaves from the fourth surface of the first prism. The first light beam is reflected towards the fourth surface by the first coating.

In another exemplary embodiment, an optical device includes an objective module, the above-mentioned prism module and an ocular module. The first prism is a roof pentaprism. The first coating is formed on the third surface of the first prism. The fifth surface of the fifth surface adjoins the seventh surface. The prism module is disposed between the objective module and the ocular module. The first light beam sequentially passes through the objective module, the prism module and the ocular module. Central axes of the objective module and the ocular module are in parallel without overlapping.

An optical device in accordance with an exemplary embodiment of the invention includes an objective module, a prism module and an ocular module. The prism module includes a first prism, a second prism and a first coating wherein the first prism includes a first surface, a second surface, a third surface and a fourth surface; the second prism includes a fifth surface, a sixth surface and a seventh surface; the seventh surface of the second prism is disposed beside the third surface of the first prism; the first coating is disposed between the third surface and the seventh surface. A first light beam is emitted by an object, enters the first prism through the first surface, is sequentially reflected on the second surface and the third surface, and leaves from the fourth surface of the first prism. The first light beam is reflected towards the fourth surface by the first coating when reflected on the third surface. The prism module is disposed between the objective module and the ocular module, the first light beam sequentially passes through the objective module, the prism module and the ocular module. Central axes of the objective module and the ocular module are in parallel without overlapping.

In another exemplary embodiment, the optical device further includes a first reflecting unit disposed at a side of the first surface of the first prism, wherein the first light beam passes through the objective module and is reflected to the prism module by the first reflecting unit.

In yet another exemplary embodiment, the optical device further includes a display unit configured to emit a second light beam wherein the second light beam enters the second prism through the fifth surface, is reflected on the sixth surface, sequentially passes through the seventh surface and the third surface, enters the first prism, leaves from the fourth surface of the first prism, and passes through the ocular module.

In another exemplary embodiment, the prism module further includes a second coating; the first coating is formed on the third surface of the first prism and is configured to reflect the first light beam but allows the second light beam to pass therethrough; and the second coating is formed on the sixth surface of the second prism and is configured to reflect the second light beam.

In yet another exemplary embodiment, the optical device further includes a second reflecting unit and a lens unit wherein the second reflecting unit is disposed at a side of the fifth surface of the second prism; the display unit, the lens unit and the second reflecting unit are sequentially arranged along an axis parallel to the fifth surface of the second prism; and the second light beam passes through the lens unit and is reflected to the prism module by the second reflecting unit.

In another exemplary embodiment, when the light emitter is disposed at a side of the sixth surface of the second prism, the third light beam enters the second prism through the sixth surface, sequentially passes through the seventh surface and the third surface, enters the first prism, is reflected on the second surface, leaves from the first surface of the first prism, passes through the objective module, leaves the optical device, reaches the object, is reflected by the object, returns to the optical device, and is received by the light receiver. When the light receiver is disposed at a side of the sixth surface of the second prism, the third light beam passes through the objective module, leaves the optical device, reaches the object, is reflected by the object, returns to the optical device, passes through the objective module again, enters the first prism through the first surface, is reflected on the second surface, sequentially passes through the third surface and the seventh surface, enters the second prism, leaves from the sixth surface of the second prism, and is received by the light receiver.

In yet another exemplary embodiment, the prism module further includes a second coating, the first coating is formed on the third surface of the first prism and is configured to reflect the first light beam but allows the third light beam to pass therethrough, the second coating is formed on the sixth surface of the second prism and allows the third light beam to pass therethrough. Both of the first light beam and the third light beam pass through the first prism.

In another exemplary embodiment, when the light emitter is disposed at a side of the sixth surface of the second prism, the third light beam enters the second prism through the sixth surface, sequentially passes through the seventh surface and the third surface, enters the first prism, is reflected on the second surface, leaves from the first surface of the first prism, passes through the objective module, leaves the optical device, reaches the object, is reflected by the object, returns to the optical device, and is received by the light receiver. When the light receiver is disposed at a side of the sixth surface of the second prism, the third light beam passes through the objective module, leaves the optical device, reaches the object, is reflected by the object, returns to the optical device, passes through the objective module again, enters the first prism through the first surface, is reflected on the second surface, sequentially passes through the third surface and the seventh surface, enters the second prism, leaves from the sixth surface of the second prism, and is received by the light receiver. The prism module further includes a second coating, the first coating is formed on the third surface of the first prism and is configured to reflect the first light beam but allows the third light beam to pass therethrough, the second coating is formed on the sixth surface of the second prism and allows the third light beam to pass therethrough. All of the first light beam, the second light beam and the third light beam pass through the first prism.

A detailed description is given in the following embodiments with reference to the accompanying drawings.

DETAILED DESCRIPTION OF THE INVENTION

The optical device in a first embodiment of the invention is a rangefinder, including two optical systems. The difference between the two optical systems is that one is provided with a light emitter and the other is provided with a light receiver. Other elements and arrangements of the two optical systems are the same. For concision, only one optical system is described with the accompanying drawings in detail below.

Figure 1:
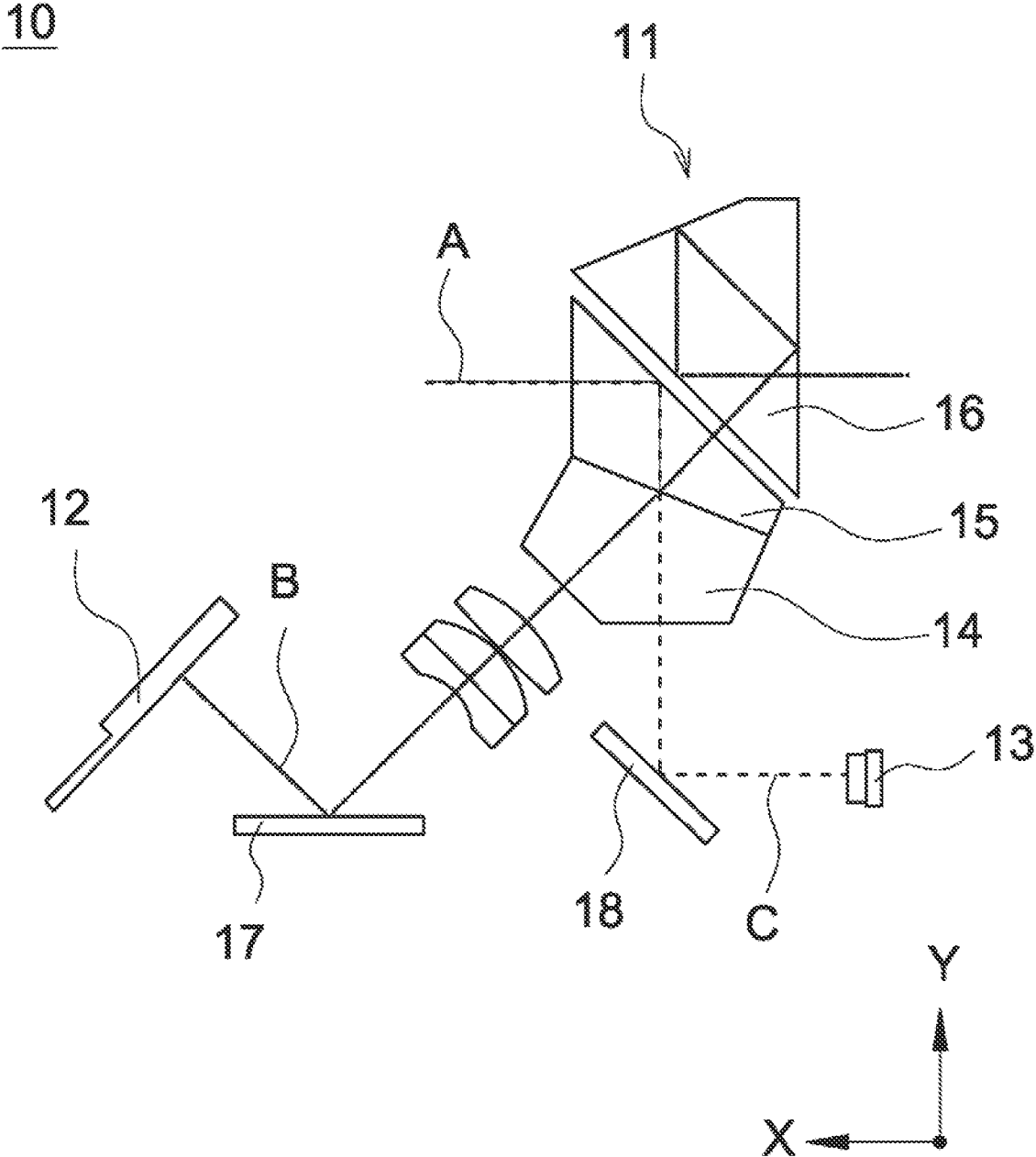
FIG. 1 depicts a structure of a conventional rangefinder.
Figure 2A:
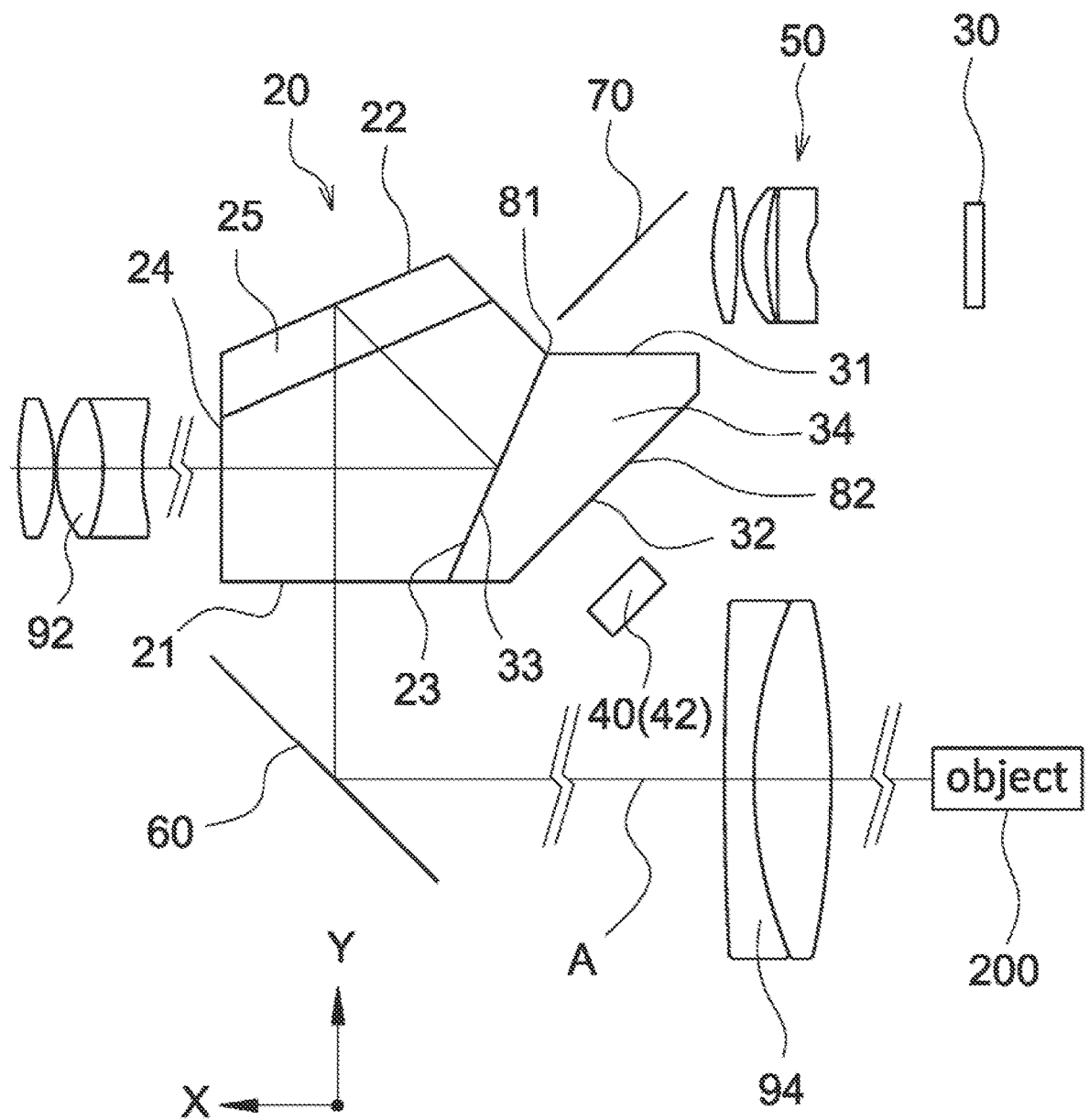
FIGS. 2A-2C depict a structure of a rangefinder in accordance with a first embodiment of the invention.
Figure 2B:
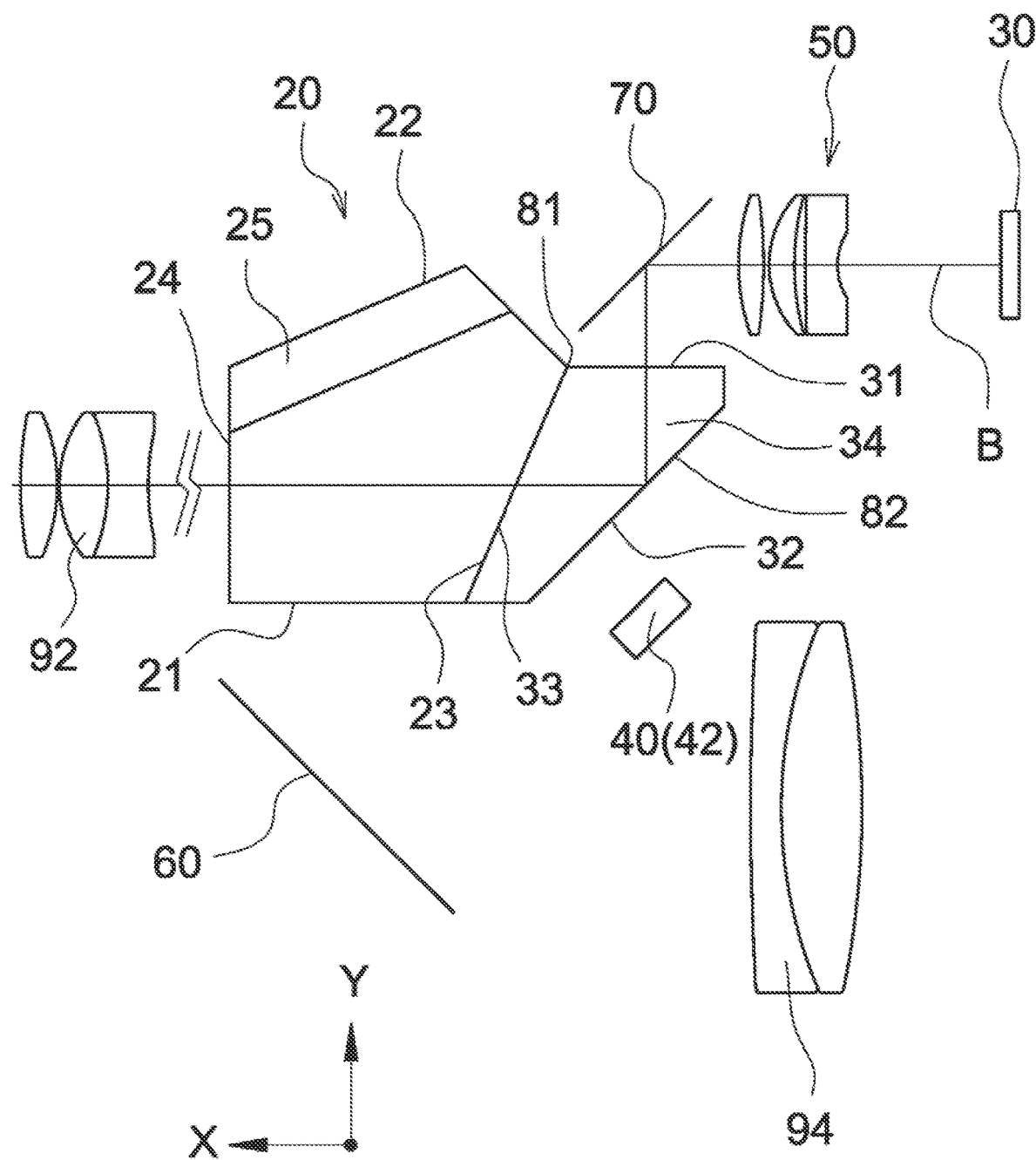
Figure 2C:
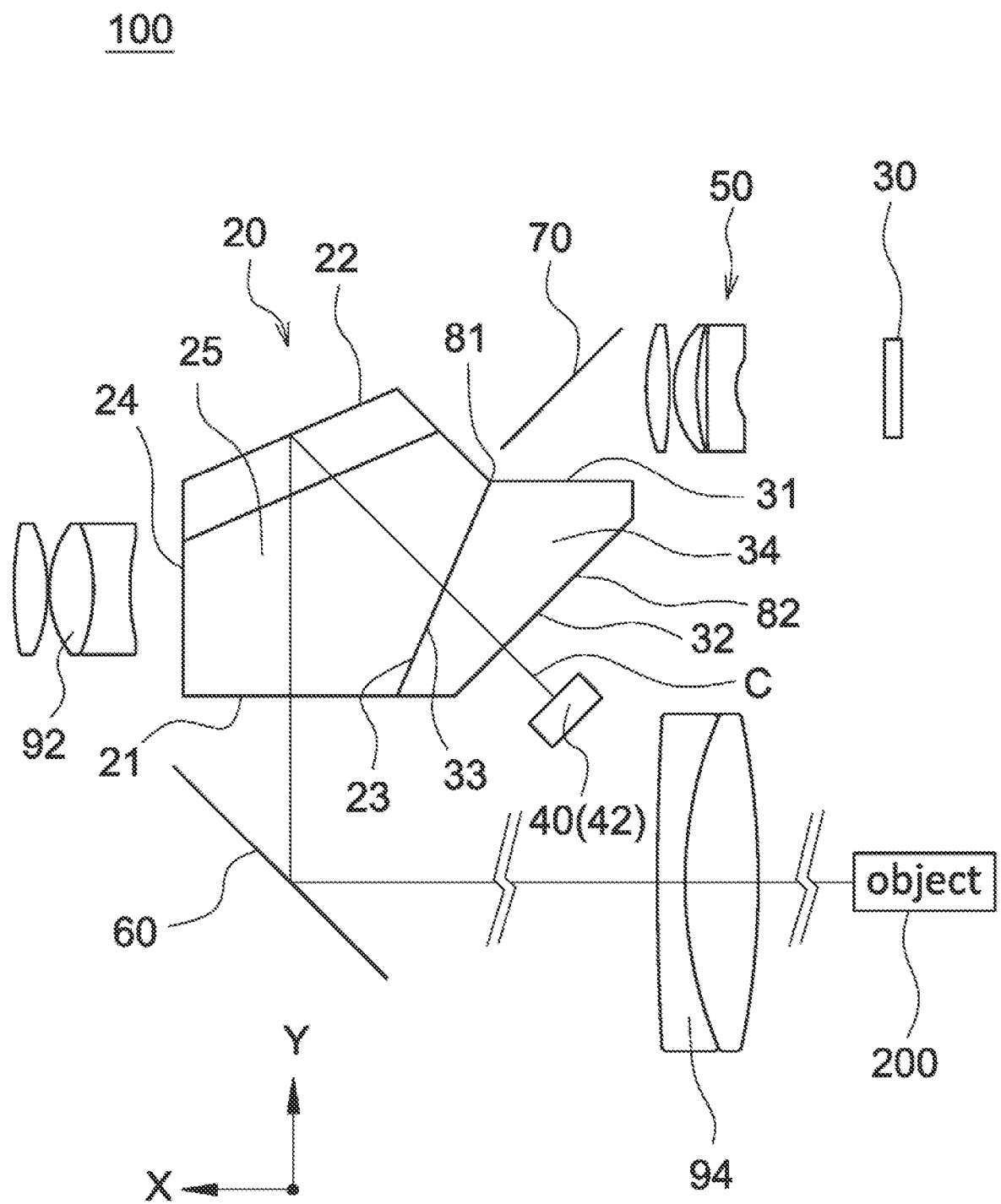

FIGS. 2A-2C depict a part of a rangefinder 100 in accordance with a first embodiment of the invention, wherein the part of the rangefinder 100 includes an objective module 94, a prism module 20, a display unit 30, a light emitter 40, a lens unit 50, a first reflecting unit 60, a second reflecting unit 70 and an ocular module 92. It is understood that another part of the rangefinder 100 is the same as the above-mentioned part except that the above-mentioned light emitter 40 is replaced with a light receiver 42. In operation, a first light beam A emitted by an object 200 sequentially passes the objective module 94, the prism module 20 and the ocular module 92. A second light beam B emitted by the display unit 30 sequentially passes through the lens unit 50, the prism module 20 and the ocular module 92. A third light beam C emitted by the light emitter 40 sequentially passes through the lens module 20 and the objective module 94, reaches the object 200, is reflected back to the rangefinder 100 by the object 200, and is received by the light receiver 42. Accordingly, the user is able to view the image of the object 200 and the image generated by the display unit 30 through the ocular module 92, and is able to know the distance between the object 200 and the rangefinder 100. The rangefinder 100 may be a binocular rangefinder or a monocular rangefinder. The structure and operation of the rangefinder 100 are described in detail below.

The prism module 20 is disposed between the objective module 94 and the ocular module 92 and includes a first prism 25 and a second prism 34. In the first embodiment, the first prism 25 is a roof pentaprism including a first surface 21, a second surface 22, a third surface 23 and a fourth surface 24 wherein a total reflection coating is formed on the second surface 22, anti-reflective coatings are formed on the first surface 21 and the fourth surface 24, and a first coating 81 is formed on the third surface 23. The first coating 81 is configured to reflect the first light beam A but allows the second light beam B and the third light beam C to pass therethrough. The second prism 34 is a half-penta prism and includes a fifth surface 31, a sixth surface 32 and a seventh surface 33 wherein an anti-reflective coating is formed on the fifth surface 31, and a second coating 82 is formed on the sixth surface 32. The second coating 82 is configured to reflect the second light beam B but allows the third light beam C to pass therethrough.

Figure 3:
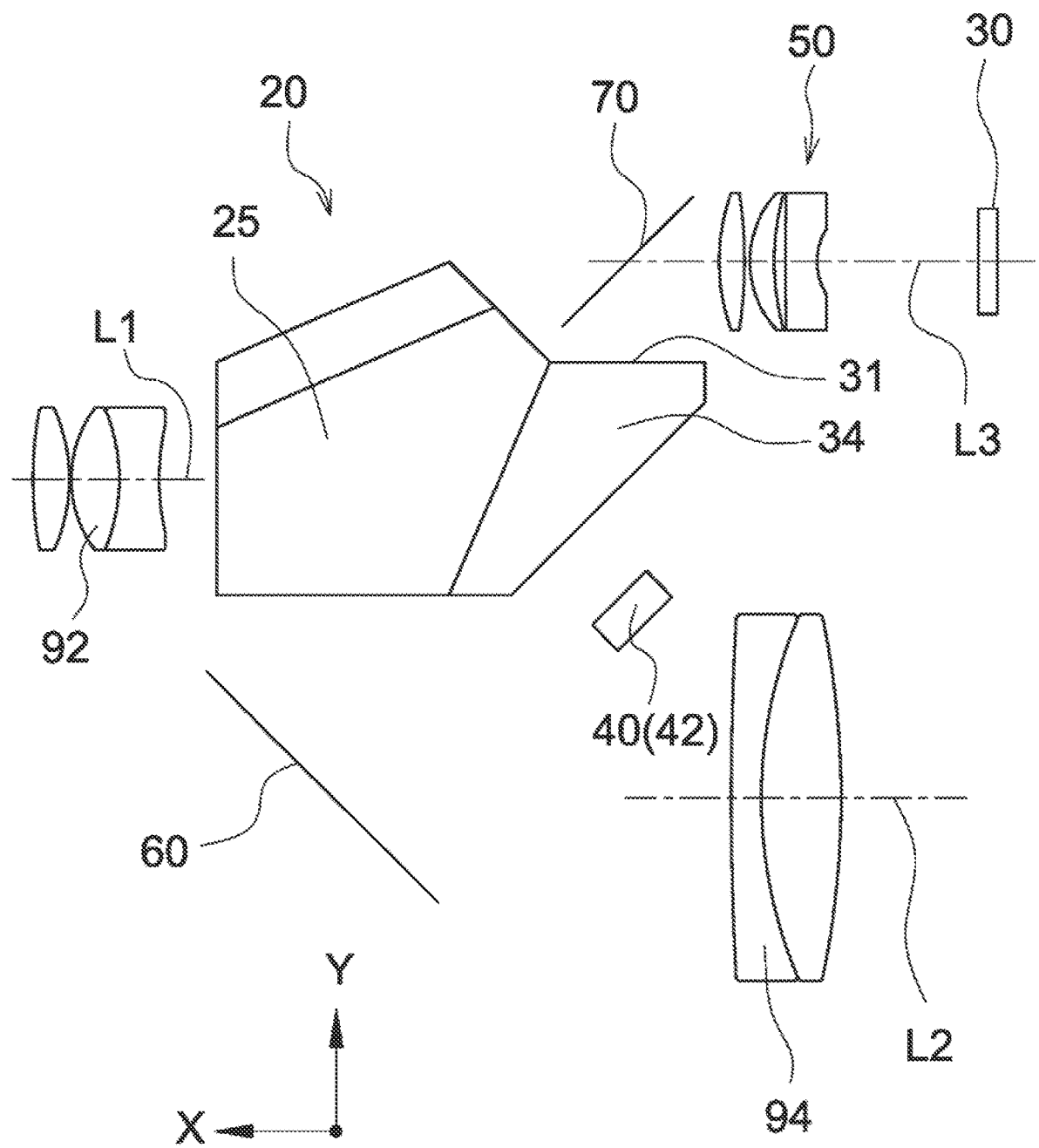
FIG. 3 depicts the structure of the rangefinder in accordance with the first embodiment of the invention wherein a central axis of an ocular module, a central axis of an objective module and an axis of a lens unit are shown.

The fourth surface 24 of the first prism 25 is disposed to face the ocular module 92. The seventh surface 33 of the second prism 34 is disposed beside the third surface 23 of the first prism 25. The sixth surface 32 of the second prism 34 is disposed to face the objective module 94. The prism module 20 of the invention has a smaller dimension than the conventional prism module in a direction parallel to the fourth surface 24 of the first prism 25 or in the Y direction of FIGS. 2A-2C. Further, the prism module 20 of the invention is provided with no Schmidt-Pechan prism system so that the problem of light leakage can be avoided. By such arrangement, therefore, a rangefinder 100 provided with the prism module 20 can have a reduced volume and better image quality. As shown in FIGS. 2A-2C, the first reflecting unit 60 is disposed at a side of the first surface 21 of the first prism 25. The light emitter 40 is disposed at a side of the sixth surface 32 of the second prism 34. The second reflecting unit 70 is disposed at a side of the fifth surface 31 of the second prism 34. As shown in FIG. 3, the display unit 30, the lens unit 50 and the second reflecting unit 70 are sequentially arranged along an axis L3 parallel to the fifth surface 31 of the second prism 34. The lens unit 50 is disposed between the display unit 30 and the second reflecting unit 70.

In the first embodiment, the first reflecting unit 60 is a reflecting mirror or a light turning prism. The display unit 30 is an organic light-emitting diode (OLED), a liquid crystal display (LCD) or other displays. The first light beam A is a visible light beam. The second light beam B is an image light beam. The third light beam is a laser beam or an invisible light beam.

As shown in FIG. 2A, after emitted by the object 200, the first light beam A enters the rangefinder 100, passes through the objective module 94, is reflected to the prism module 20 by the first reflecting unit 60, enters the first prism 25 through the first surface 21, is reflected on the second surface 22 and then reflected on the third surface 23, leaves from the fourth surface 24 of the first prism 25, and passes through the ocular module 92 for user's view (to view the image of the object 200). It is worth noting that the first reflecting unit 60 and the first prism 25 are spaced so that an axis along which the first light beam A propagates before reflected by the first reflecting unit 60 and another axis along which the first light beam A propagates after leaving the prism module 20 are not coaxial. Therefore, the objective module 94 and the ocular module 92 can be arranged along different axes in the rangefinder 100, without increasing the volume of the prism module 20. In other words, as shown in FIG. 3, a central axis L2 of the objective module 94 and a central axis L1 of the ocular module 92 do not overlap but are in parallel. By such arrangement, the rangefinder 100 (e.g. binocular rangefinder) can have a reduced pupil distance and a reduced volume.

As shown in FIG. 2B, the second light beam B emitted by the display unit 30 passes through the lens unit 50, is reflected to the prism module 20 by the second reflecting unit 70, enters the second prism 34 through the fifth surface 31, is reflected by the sixth surface 32, sequentially passes through the seventh surface 33 and the third surface 23, enters the first prism 25, leaves from the fourth surface 24 of the first prism 25, and passes through the ocular module 92 for user's view (for the user to view the image generated by the display unit 30). After passing through the prism module 20, the second light beam B of the invention is reflected fewer times than that of the prior art. In the invention, therefore, the brightness of the image generated by the display unit 30 can be enhanced.

As shown in FIG. 2C, the third light beam C emitted by the light emitter 40 enters the second prism 34 through the sixth surface 32, sequentially passes through the seventh surface 33 and the third surface 23, enters the first prism 25, is reflected on the second surface 22, leaves from the first surface 21 of the first prism 25, is reflected by the first reflecting unit 60, passes through the objective module 94, and reaches the object 200. Then, the third light beam C is reflected by the object 200, returns to the rangefinder 100, and is received by the light receiver 42 for calculating the distance between the object 200 and the rangefinder 100. Thanks to the prism module 20, the effective optical diameter of the third light beam C (emitted by the light emitter 40) and that of the second light beam B (emitted by the display unit 30) do not overlap and the interference therebetween can be avoided. Therefore, energy of the third light beam C emitted by the light emitter 40 can be increased.

In a second embodiment of the invention, the light emitter 40 and the light receiver 42 exchange their locations. That is, the light receiver 42 is disposed at a side of the sixth surface 32 of the second prism 34. In operation, the third light beam C emitted by the light emitter 40 is reflected by the object 200, sequentially passes through the objective module 94 and the prism module 20, and reaches the light receiver 42. Specifically, after passing through the objective module 94, the third light beam C is reflected by the first reflecting unit 60, enters the first prism 25 through the first surface 21, is reflected on the second surface 22, sequentially passes through the third surface 23 and the seventh surface 33, enters the second prism 34, leaves from the sixth surface 32 of the second prism 34, and reaches the light receiver 42. The light receiver 42 receives the third light beam C reflected by the object 200 so that the rangefinder can calculate the distance between the object 200 and the rangefinder 100. Other arrangement and operation of the second embodiment are the same as those of the first embodiment, and therefore the descriptions thereof are omitted.

In a third embodiment, the optical path of the second light beam B of FIG. 2B is not utilized for user's view. Instead, the user directly views the display unit 30 to obtain the image information. Other arrangement and operation of the third embodiment are the same as those of the first embodiment and the second embodiment, and therefore the descriptions thereof are omitted.

The prism module 20 includes a first prism 25 and a second prism 34, wherein the first prism 25 includes a first surface 21, a second surface 22, a third surface 23 and a fourth surface 24, and the second prism 34 includes a fifth surface 31, a sixth surface 32 and a seventh surface 33. The seventh surface 33 of the second prism 34 is disposed beside the third surface 23 of the first prism 25. A first coating 81 is disposed between the third surface 23 and the seventh surface 33. In operation, a first light beam A emitted by an object 200 enters the first prism 25 through the first surface 21, is reflected on the second surface 22 and then reflected on the third surface 23, and leaves from the fourth surface 24 of the first prism 25. The first light beam A is reflected by the first coating 81 towards the fourth surface 24. Thanks to the new structure of the prism module 20, the volume can be reduced and the image quality can be promoted. The seventh surface 33 of the second prism 34 is disposed beside the third surface 23 of the first prism 25. The prism module 20 of the invention has a smaller dimension than the conventional prism module in a direction parallel to the fourth surface 24 of the first prism 25 or in the Y direction of FIGS. 2A-2C. Further, the prism module 20 of the invention is provided with no Schmidt-Pechan prism system so that the problem of light leakage can be avoided. By such arrangement, therefore, a rangefinder 100 provided with the prism module 20 can have a reduced volume and better image quality. Further, the first light beam A is only reflected twice in the prism module 20 and the two reflections are limited to occur in the first prism 25. Therefore, the brightness of the first light beam A generated by the object 200 is not reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A prism module, comprising:
a first prism comprising a first surface, a second surface, a third surface and a fourth surface wherein the fourth surface adjoins the second surface and the first surface, and the first surface adjoins the fourth surface and the third surface;
a second prism comprising a fifth surface, a sixth surface and a seventh surface wherein the seventh surface of the second prism is disposed beside the third surface of the first prism;
a first coating disposed between the third surface and the seventh surface;
wherein a light emitter is configured to emit a third light beam to an object;
wherein a light receiver is configured to receive the third light beam reflected by the object for calculating a distance between the object and the light receiver;
wherein a first light beam is emitted by the object, enters the first prism through the first surface, is sequentially reflected on the second surface and the third surface, and leaves from the fourth surface of the first prism;
wherein the first light beam is reflected towards the fourth surface by the first coating.

2. An optical device comprising:
an objective module;
the prism module as claimed in claim 1 wherein the first prism is a roof pentaprism, the first coating is formed on the third surface of the first prism, and the fifth surface of the fifth surface adjoins the seventh surface; and
an ocular module;
wherein the prism module is disposed between the objective module and the ocular module, the first light beam sequentially passes through the objective module, the prism module and the ocular module, and central axes of the objective module and the ocular module are in parallel without overlapping.

3. The optical device as claimed in claim 2, further comprising a first reflecting unit disposed at a side of the first surface of the first prism, wherein the first light beam passes through the objective module and is reflected to the prism module by the first reflecting unit.

4. The optical device as claimed in claim 2, further comprising a display unit configured to emit a second light beam wherein the second light beam enters the second prism through the fifth surface, is reflected on the sixth surface, sequentially passes through the seventh surface and the third surface, enters the first prism, leaves from the fourth surface of the first prism, and passes through the ocular module.

5. The optical device as claimed in claim 4, wherein the prism module further comprises a second coating; the first coating is formed on the third surface of the first prism and is configured to reflect the first light beam but allows the second light beam to pass therethrough; and the second coating is formed on the sixth surface of the second prism and is configured to reflect the second light beam.

6. The optical device as claimed in claim 4, further comprising a second reflecting unit and a lens unit wherein the second reflecting unit is disposed at a side of the fifth surface of the second prism; the display unit, the lens unit and the second reflecting unit are sequentially arranged along an axis parallel to the fifth surface of the second prism; and the second light beam passes through the lens unit and is reflected to the prism module by the second reflecting unit.

7. The optical device as claimed in claim 4, wherein:
when the light emitter is disposed at a side of the sixth surface of the second prism, the third light beam enters the second prism through the sixth surface, sequentially passes through the seventh surface and the third surface, enters the first prism, is reflected on the second surface, leaves from the first surface of the first prism, passes through the objective module, leaves the optical device, reaches the object, is reflected by the object, returns to the optical device, and is received by the light receiver;
when the light receiver is disposed at a side of the sixth surface of the second prism, the third light beam passes through the objective module, leaves the optical device, reaches the object, is reflected by the object, returns to the optical device, passes through the objective module again, enters the first prism through the first surface, is reflected on the second surface, sequentially passes through the third surface and the seventh surface, enters the second prism, leaves from the sixth surface of the second prism, and is received by the light receiver;
the prism module further comprises a second coating, the first coating is formed on the third surface of the first prism and is configured to reflect the first light beam but allows the third light beam to pass therethrough, the second coating is formed on the sixth surface of the second prism and allows the third light beam to pass therethrough; and
all of the first light beam, the second light beam and the third light beam pass through the first prism.

8. The optical device as claimed in claim 2, wherein:
when the light emitter is disposed at a side of the sixth surface of the second prism, the third light beam enters the second prism through the sixth surface, sequentially passes through the seventh surface and the third surface, enters the first prism, is reflected on the second surface, leaves from the first surface of the first prism, passes through the objective module, leaves the optical device, reaches the object, is reflected by the object, returns to the optical device, and is received by the light receiver;
when the light receiver is disposed at a side of the sixth surface of the second prism, the third light beam passes through the objective module, leaves the optical device, reaches the object, is reflected by the object, returns to the optical device, passes through the objective module again, enters the first prism through the first surface, is reflected on the second surface, sequentially passes through the third surface and the seventh surface, enters the second prism, leaves from the sixth surface of the second prism, and is received by the light receiver.

9. The optical device as claimed in claim 8, wherein:
the prism module further comprises a second coating, the first coating is formed on the third surface of the first prism and is configured to reflect the first light beam but allows the third light beam to pass therethrough, the second coating is formed on the sixth surface of the second prism and allows the third light beam to pass therethrough; and
both of the first light beam and the third light beam pass through the first prism.

10. An optical device comprising:
an objective module;
a prism module comprising a first prism, a second prism and a first coating wherein the first prism comprises a first surface, a second surface, a third surface and a fourth surface; the second prism comprises a fifth surface, a sixth surface and a seventh surface; the seventh surface of the second prism is disposed beside the third surface of the first prism; the first coating is disposed between the third surface and the seventh surface; and
an ocular module;
wherein a first light beam is emitted by an object, enters the first prism through the first surface, is sequentially reflected on the second surface and the third surface, and leaves from the fourth surface of the first prism;
wherein the first light beam is reflected towards the fourth surface by the first coating when reflected on the third surface;
wherein the prism module is disposed between the objective module and the ocular module, the first light beam sequentially passes through the objective module, the prism module and the ocular module, and central axes of the objective module and the ocular module are in parallel without overlapping.

11. The optical device as claimed in claim 10, further comprising a first reflecting unit disposed at a side of the first surface of the first prism, wherein the first light beam passes through the objective module and is reflected to the prism module by the first reflecting unit.

12. The optical device as claimed in claim 10, further comprising a display unit configured to emit a second light beam wherein the second light beam enters the second prism through the fifth surface, is reflected on the sixth surface, sequentially passes through the seventh surface and the third surface, enters the first prism, leaves from the fourth surface of the first prism, and passes through the ocular module.

13. The optical device as claimed in claim 12, wherein the prism module further comprises a second coating; the first coating is formed on the third surface of the first prism and is configured to reflect the first light beam but allows the second light beam to pass therethrough; and the second coating is formed on the sixth surface of the second prism and is configured to reflect the second light beam.

14. The optical device as claimed in claim 12, further comprising a second reflecting unit and a lens unit wherein the second reflecting unit is disposed at a side of the fifth surface of the second prism; the display unit, the lens unit and the second reflecting unit are sequentially arranged along an axis parallel to the fifth surface of the second prism; and the second light beam passes through the lens unit and is reflected to the prism module by the second reflecting unit.

15. The optical device as claimed in claim 12, further comprising:

a light emitter configured to emit a third light beam to an object; and
a light receiver configured to receive the third light beam reflected by the object for calculating a distance between the object and the light receiver;
when the light emitter is disposed at a side of the sixth surface of the second prism, the third light beam enters the second prism through the sixth surface, sequentially passes through the seventh surface and the third surface, enters the first prism, is reflected on the second surface, leaves from the first surface of the first prism, passes through the objective module, leaves the optical device, reaches the object, is reflected by the object, returns to the optical device, and is received by the light receiver;
when the light receiver is disposed at a side of the sixth surface of the second prism, the third light beam passes through the objective module, leaves the optical device, reaches the object, is reflected by the object, returns to the optical device, passes through the objective module again, enters the first prism through the first surface, is reflected on the second surface, sequentially passes through the third surface and the seventh surface, enters the second prism, leaves from the sixth surface of the second prism, and is received by the light receiver;
the prism module further comprises a second coating, the first coating is formed on the third surface of the first prism and is configured to reflect the first light beam but allows the third light beam to pass therethrough, the second coating is formed on the sixth surface of the second prism and allows the third light beam to pass therethrough; and
all of the first light beam, the second light beam and the third light beam pass through the first prism.

16. The optical device as claimed in claim 10, further comprising:
a light emitter configured to emit a third light beam to an object; and
a light receiver configured to receive the third light beam reflected by the object for calculating a distance between the object and the light receiver;
wherein when the light emitter is disposed at a side of the sixth surface of the second prism, the third light beam enters the second prism through the sixth surface, sequentially passes through the seventh surface and the third surface, enters the first prism, is reflected on the second surface, leaves from the first surface of the first prism, passes through the objective module, leaves the optical device, reaches the object, is reflected by the object, returns to the optical device, and is received by the light receiver;
wherein when the light receiver is disposed at a side of the sixth surface of the second prism, the third light beam passes through the objective module, leaves the optical device, reaches the object, is reflected by the object, returns to the optical device, passes through the objective module again, enters the first prism through the first surface, is reflected on the second surface, sequentially passes through the third surface and the seventh surface, enters the second prism, leaves from the sixth surface of the second prism, and is received by the light receiver.

17. The optical device as claimed in claim 16, wherein:
the prism module further comprises a second coating, the first coating is formed on the third surface of the first prism and is configured to reflect the first light beam but allows the third light beam to pass therethrough, the second coating is formed on the sixth surface of the second prism and allows the third light beam to pass therethrough; and both of the first light beam and the third light beam pass through the first prism.

* * * * *